United States Patent
Tam

(10) Patent No.: US 8,315,371 B2
(45) Date of Patent: Nov. 20, 2012

(54) AUTOMATIC KEY PROGRAMMING

(75) Inventor: Terry Tam, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 129 days.

(21) Appl. No.: 12/930,480

(22) Filed: Jan. 6, 2011

(65) Prior Publication Data
US 2012/0177191 A1    Jul. 12, 2012

(51) Int. Cl.
*H04M 7/00* (2006.01)
(52) U.S. Cl. .................. 379/225; 379/231; 379/234
(58) Field of Classification Search ............... 379/225, 379/231, 234
See application file for complete search history.

(56) References Cited

U.S. PATENT DOCUMENTS

| | | | |
|---|---|---|---|
| 6,989,820 B1 | 1/2006 | Baker et al. | |
| 7,706,359 B2 * | 4/2010 | Pounds et al. | 370/353 |
| 2004/0165713 A1 * | 8/2004 | Leighton | 379/225 |
| 2005/0198147 A1 * | 9/2005 | Pastro et al. | 709/206 |
| 2011/0038365 A1 * | 2/2011 | Pounds et al. | 370/352 |
| 2011/0200034 A1 * | 8/2011 | Delveaux et al. | 370/352 |

FOREIGN PATENT DOCUMENTS

| | | |
|---|---|---|
| EP | 2009885 A1 | 12/2008 |
| EP | 2061220 A1 | 5/2009 |

* cited by examiner

*Primary Examiner* — Creighton Smith

(57) ABSTRACT

Methods are disclosed for programming shortcut keys on a computing device, such as a digital telephony device. One method comprises extracting user context information for a user from a server in communication with the digital telephony device. Key feature grouping information can be created based on the user context information. A key mapping layout can be generated for the digital telephony device by applying rules to designate an order in which selected groups in the key feature grouping information are assigned to selected keys on the digital telephony device to generate a key mapping layout. The keys on the digital telephony device can be programmed using the key mapping layout.

20 Claims, 4 Drawing Sheets

AUTOMATIC KEY PROGRAMMING

BACKGROUND

Modern telephones used in business and industries often include a number of keys in addition to the keys in the numerical keypad used to dial telephone numbers. The additional keys are traditionally either programmable feature keys or programmable line keys. Programmable feature keys allow "hot key" like access to a PBX feature (such as a group page feature or speed dial) and a programmable line key provides instant access to a line. As telephones have increased in sophistication, often including many features of portable computing devices, the keys can also be used as hotkeys to enable a user to interact with a graphical user interface. The programmable keys may take the form of physical keys or soft keys on the telephony device. In addition, the keys may be purely virtual represented by a software based Computer Telephony Integration (CTI) application on a computer.

As the number of additional keys has increased, and the number of potential uses for each key expands, the complexity of programming and updating the keypad to provide the desired response from each key has also increased. Programming of keys on a telephone is often a labor intensive activity. Each time a new employee is hired or a person moves to a different location, the keys on the telephone may need to be reassigned. This can require programming each separate key individually.

Even more difficult, each time people's roles and positions change within a company and without, the keys on dozens or even hundreds of phones may need to be reprogrammed to properly identify their function. The difficulty of setting up and maintaining the functionality of the additional keys or buttons on a telephone or graphical computing device can add significant cost of ownership to a company.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
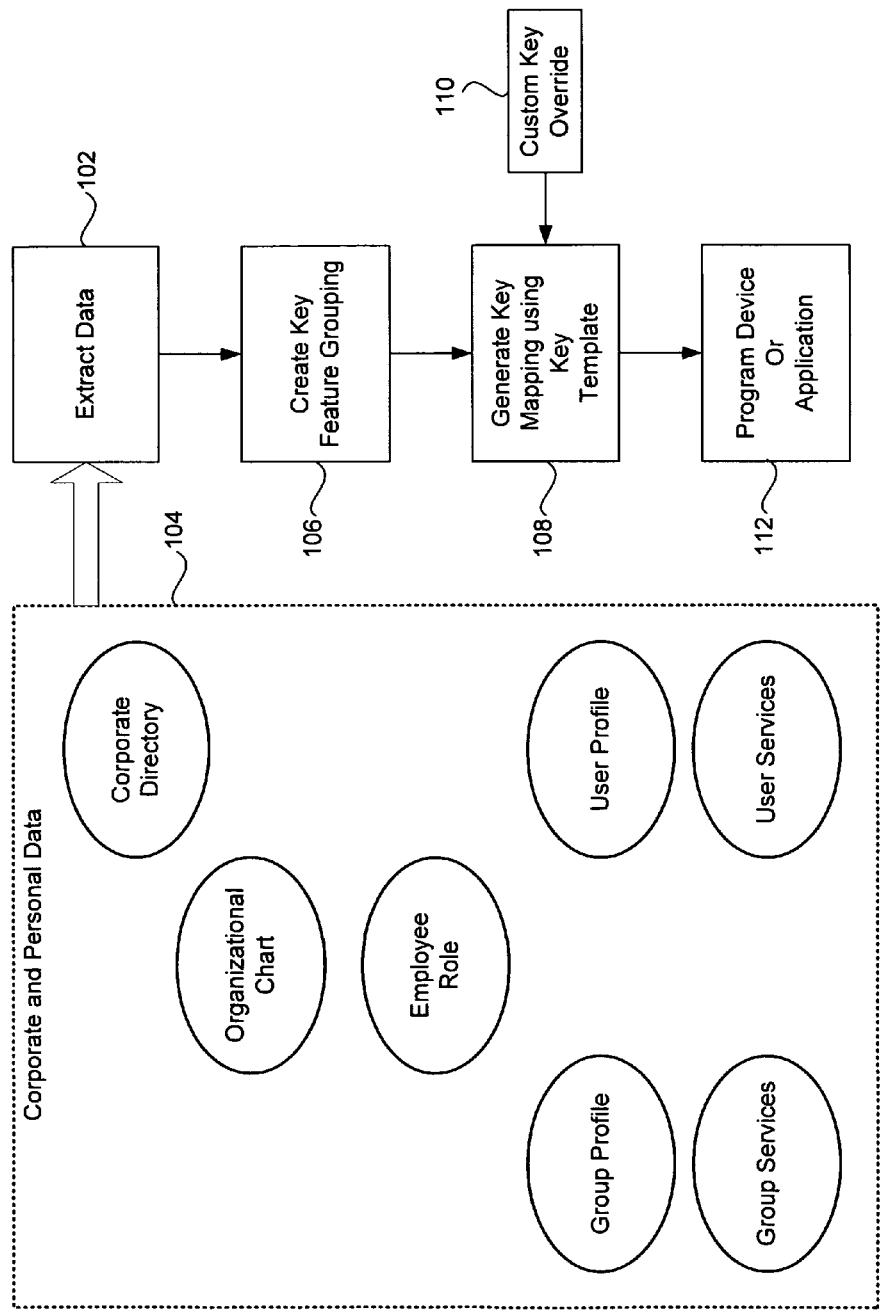
FIG. 1 illustrates a block diagram of a process for programming keys on a digital telephony device in accordance with one example embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "key squaring" refers to an m×n grouping of keys, where m is the number of columns of keys or buttons available and n is a positive integer.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Key programming for an application or device such as a digital telephone has traditionally involved a user selecting a particular key and assigning a function to the key. Keys that are controlled by the user can be referred to as personal keys. Alternatively, an administrator may assign a function to keys that are defined as system keys. The exercise of assigning functions to keys can be quite tedious since each key is programmed one by one. The programming can also be error prone since it can be difficult to remember which keys were programmed, especially for a device with many keys. For instance, some models of office phones have 48 keys that can be programmed.

In order to effectively program all of the keys on devices such as digital telephones, solutions such as cloning have been developed. Cloning involves programming the keys on a first device, such as a phone. Once the phone has been successfully programmed, a copying method can be used to replicate the keys onto a subsequent group of phones.

The cloning method, however, has several drawbacks. The initial model created on the first programmed device may be known. However, as devices are updated and changed over time, variances can occur that make it difficult to have a single template. Thus, as time passes, it becomes more difficult to find a base template that can be reused between devices. In addition, the cloning method cannot be used to copy and setup personal keys since the personal keys are unique on a per user basis.

To overcome the limitations in key programming, the key layout and programming can be accomplished through the use of available system resources, such as corporate information located on one or more servers. At least one of the one or more servers can be in communication with the digital telephone. Personal information, such as a personal telephone directory, can be placed on a server to enable the personal information to be accessed. The available information can be mined to determine key groupings and features to program a user's end device. Once the key groupings are determined, the groupings can be deployed onto a set of keys or buttons for a device or application based on a predefined or custom template.

The key groupings can then be updated based on changes in the available information located on the servers and/or local computing devices connected with the user's telephone, or the telephone system. This enables the key groupings to be updated automatically, thereby significantly reducing the time and effort needed to maintain programmable keys with up-to-date information.

Using the available information to program key groupings can also provide a consistent key grouping layout. The layout may be based on a company's policy. Key reorganization may be accomplished automatically without having the end-user or administrator manually moving key functions to provide space for more key groupings. For instance, if the top 12 keys are used for a key squaring group for a phone and immediately below that, there are five call pickup keys on a 48 key set, an administrator would typically have to manually move the call pickup keys to allow for a $13^{th}$ or greater member of the key squaring group to be added in a continuous fashion.

In accordance with one embodiment of the present invention, an automatic key programming process is disclosed. The process can be divided into three separate operations, as illustrated in the block diagram of FIG. 1. A first operation 102 involves extracting corporate and personal data for a user from business entities 104 that can be accessed on a computer such as a server or personal computer. In one embodiment, the server may be a telephony server such as private branch exchange (PBX) server or another type of telephony server such as an internet protocol (IP) server.

Examples of business entities can include a corporate directory, an organizational chart, an employee role definition for the user, a group profile of the group to which the user has been assigned, group services, a profile of the user, and user services. A group service is a service that is applied to a selected group. For instance, with respect to telecommunication services, a group service may be a paging group, which allows a group of people to all be paged at one time. User services are services for a particular user, who may or may not belong to a group. Other categories of information may also be mined for desired information that can be used in automatic key programming, as can be appreciated.

A second operation 106 includes generating key feature groupings based on the data. This operation determines which services a user is involved with the programmatic setting of keys, and groups the keys based on the service or feature. Different types of groupings may be created for common features or services. For example, direct station select (DSS)/busy lamp field (BLF) groupings can be created. In addition, one or more key squaring groups, each comprised of an n×m grouping of keys can be generated, where m is the number of columns of keys or buttons available and n is a positive integer. The size of each key squaring group may be determined based on the amount of information (i.e. number of hot keys or shortcut key(s) that have been generated in operation 104). Additional key feature groupings that can be generated include call pickup group(s), personal speed dial group(s), and personal feature group(s). Additional key feature groupings may be generated as well.

A third operation 108 is to generate a key mapping layout by applying rules, to assign the key grouping information from operation 106 to a key layout. The selected rules are referred to as a key layout template. The key layout template can be selected from a group of templates based on the role of the user.

A custom key override process 110 can be used to allow for user customization. The key override data can be used to allow a user to customize the layout of his or her keys by forcing the system to select a specific key or button for a specific feature. For instance, a user may want key 3 on her phone to be a speed dial for her home phone number. The custom key override process enables the user to reserve selected keys or buttons for desired purposes.

A fourth operation 112 involves programming the functionality of a selected device or application based on the output from the key mapping process 108. The functionality can be updated at a selected frequency or event driven to enable the keys that are programmed using the automatic key programming process to remain updated as changes occur throughout a business. This will be discussed more fully below.

Corporate and Personal Data

The database(s) within many businesses and corporations contain sufficient information to provide all of the desired parameters for the key and button programming for a user's device or application. For example, a user's personal contact list entry in a database and the business's corporate contact list, such as a corporate telephone directory, can be used to obtain information for desired shortcut keys. The organizational chart and employee role can be used to determine how to group the information into selected groups, referred to as key groupings.

The employee's role can define the privileges and services which an employee has. The employee's role can characterize the employee's work responsibilities and capabilities. An employee's role is typically defined by an employer, although an employee may define his or her role at a smaller company. A company can specify that each employee in a selected role will have a specified type of phone. The corporate and personal databases can provide the data used to contact selected people based on the employee's role.

For example, Company A may have an employee role for a software developer. Company A may specify that each software developer will have a selected phone with 12 programmable keys. A key template can be designed for the role. The key template provides the rules that state where and how the key groupings will be allocated to the keys of a particular device, such as a telephone.

For instance, the key template for a software developer can indicate that key 1 is the prime line for the phone and keys 2 to 5 are reserved for personal speed dial keys. Key 12 can be reserved for the speed dial key for the employee's manager and keys 6 to 11 can be reserved for speed dial keys for peers within the software developer group. Mining the corporate directories and other server information, the speed dial numbers for the keys can be filled automatically for each employee. The employee's role can be used to create a base template for an employee. However, an administrator can add to the base template for the employee if desired.

Key Groupings

A key grouping comprises associating keys or buttons that have common features. For instance, groups having common features can be grouped as set of selected system keys or a group of DSS/BLF keys. A set of hotkeys for an E-mail application that can be grouped on function keys on a PC keyboard or icons on a tablet computer.

Key groupings can have a one to many type of association. They may also be modeled using a one to one association. The one to one case represents features that may use a single key or button. For example, a do not disturb key on a phone has a one to one mapping.

Key groupings allow groups to be formed that are unique to a particular user. For example, a user may have an employee role as a sales person. The employee can be a member of a sales group. The key grouping algorithm can easily create a key grouping for the user that only contains the other members of the sales group and not the user. Similarly, other members of the group having key groupings on their respective phones for the other members of the sales group. This is made possible since the key grouping can be dynamically created and updated.

Key groupings may be based on the role of members in a group. For instance, people with a role of sales manager may have a higher precedence in a key layout over people with a role of sales person. The arrangement of persons in a grouping, such as a key squaring group, can be set according to pre-established rules. For instance, a person's position within a company hierarchy or organizational chart may be used to determine the contacts within a grouping and the order of the people listed in the group. Alternatively, other means such as length of time with the company, alphabetical sorting, and so forth may also be used to identify a person's location in a key grouping.

Additional types of key groupings can include a key line appearance. A key line appearance is an indicator on a telephone that turns on (i.e. illuminates) when a selected line is in use. For instance, an administrative assistant can have a key line appearance for his boss. When the boss is on her phone, the key line appearance indicator will indicate that the boss's line is being used. Additional key groupings can include a set of user speed dial keys (both private and public), a paging key, a headset key, and a group park key.

Key Layout Templates

Traditionally, hardware keys or buttons are identified by assigning a unique index value in a software program. The unique index value may be a numeric or alphanumeric value that uniquely identifies a key relative to other keys. The values assigned to keys are typically indexed relative to a key's physical location. For instance, a PC keyboard often includes up to twelve programmable function keys (F1-F12) located on the top of the keyboard. There are a variety of different types of key layouts for digital telephony devices. One example embodiment involves the use of a digital telephony device having 48 keys in two columns, with 24 keys in each column. The left hand column can be identified using even numbers starting with two on the bottom, and the right hand column includes odd numbered keys starting with one on the bottom. This example is not intended to be limiting. Key layout templates can be used for substantially any key layout on a digital telephone or other type of electrical device.

Table 1 provides an example of key services and features that are available for programming on digital telephony devices using Mitel® Communications Director (MCD) call control software release 10.1 UR1. A key layout template may be created to map all of the key services and features listed in Table 1.

TABLE 1

MCD Programmable Features

| Line Type | Description |
|---|---|
| Account Code Non Verified | The key is programmed as an Account Code key for non-verified account codes. |
| Account Code Verified | The key is programmed as an Account Code key for verified account codes. |
| ACD | This is key programmed as an ACD agent log in/log out key. |
| Analog Line | This key is programmed to access an analog line on a telephone with a Line Interface Module attached. |
| Application | The key is programmed as an application (for example, as a video key for 5700 Voice First Application or VCON Video Conferencing). |
| Auto Answer | The key is programmed as an Auto Answer key. |
| Call Announce | This key is not supported. Do not program. |
| Call Fwd Always | The key is programmed as a Call Forward-Always feature access key. |
| Call Fwd Busy | The key is programmed as a Call Forward-Busy feature access key. |
| Call Fwd Busy External | The key is programmed as a Call Forward-Busy (External Source) key. |
| Call Fwd Busy Internal | The key is programmed as a Call Forward Busy-(Internal Source) feature access key. |
| Call Fwd No Ans. External | The key is programmed as a Call Forward-No Answer (External Source) key. |
| Call Fwd No Ans. Internal | The key is programmed as a Call Forward-No Answer (Internal Source) feature access key. |
| Call Fwd No Answer | The key is programmed as a Call Forward-No Answer feature access key. |
| Call History | The key is programmed to turn-on or turn-off Call History recording on that set. |
| Call Park | This key is programmed as a Call Park feature access key. |
| Call Park-Retrieve | This key is programmed as a Call Park-Retrieve feature access key. |
| Call Pickup | The key is programmed as a Dialed Call Pickup key. |
| Callback | The key is programmed as a Callback key. |
| Campon | The key is programmed as a Camp-on key. |
| Cancel | This key is a Cancel key. (Used to end a call in progress and to discard inputs during a set programming session. |
| CDE Speedcall | The key is a Speed Call key programmed during system programming. |
| Direct Page | The key is programmed as a Direct Page key. |
| Do Not Disturb | The key is programmed as a Do Not Disturb key. |
| Double Flash | The key is programmed to send a double Trunk Flash. |
| DSS/Busy Lamp | The key is a Direct Station Select (DSS) key of the associated directory number while the corresponding appearance displays the status of the monitored device. |
| Emergency Call | The key is programmed as an Emergency Call Notification feature key. |
| Generic Group Alert | The key is an ACD Generic Threshold Alert indicator. |
| Group Listen | This key is programmed a Group Listen feature key |

TABLE 1-continued

MCD Programmable Features

| Line Type | Description |
|---|---|
| Group Park | This key is programmed as a Group Park feature access key. |
| Group Presence | This key is programmed as a Group Presence feature access key. |
| Headset | The key is programmed as a Headset key. |
| Hold | This key is programmed as a Hold key. |
| Hot Desking | This key is programmed as a hot desking key (used to initiate a hot desk log in). |
| Key System | The corresponding directory number is part of a key system group. |
| Make Busy | The key is programmed as a Make Busy key. |
| Meet Me Answer | The key is programmed as a Meet Me Answer key. |
| Message | This is a Message key. (Used on certain phones to request a Callback or respond to a message waiting indication) |
| Message Waiting Indication | The key is programmed as a message waiting indicator for a voice mailbox. |
| Microphone | This key is a Microphone key. |
| Multicall | The corresponding directory number is part of a multicall group. |
| Music | The key is programmed as a Music key. |
| Night Answer | The key is programmed as a Trunk Answer From Any Station (TAFAS) key. |
| Not Assigned | The key is not programmed in the System Administration Tool or by the user. |
| Override | The key is programmed as an Override key. |
| Paging | The key is programmed as a Paging key. |
| Personal Presence | This key is programmed to toggle the Group Presence state of a Personal Ring Group member. |
| Phone App | This key is programmed to launch an application (People, Call History, Visual Voice Mail, etc.). |
| Phone Lock | This key is programmed as a Phone Lock key. |
| Phonebook | This key is a Phonebook key. |
| Privacy Release | The key is programmed as a Privacy Release key. |
| Record-A-Call | The key is programmed as a Record-A-Call feature key. |
| Redial | This key is a Redial key. |
| Release | The key is programmed as a Release key. |
| Secretarial | The key allows secretarial transfer of calls on soft hold to the associated directory number as well as all DSS/busy lamp key functions. |
| Single Flash | The key is programmed to send a single Trunk Flash. |
| Single Line | The corresponding directory number is a single line. |
| Speak@Ease ® | This key is a Speak@Ease ® (Mitel Speech Server) key |
| Speaker | This key is a Speaker key. |
| Specific Group Alert | The key is an ACD Specific Threshold Alert indicator. |
| Superkey | This key is a Superkey. |
| Swap | The key is programmed as a Call Swap feature access key. |
| Tag Call | The key is programmed to invoke an SMDR record of the call. |
| Threshold Alert | The key is an ACD Threshold Alert indicator. |
| Trans/Conf | The key is a Transfer/Conference key. |
| URL Line | The key is programmed to launch a web page or other resource from the specified URL. |
| User Speedcall | The key is a Speed Call key programmed by the user. |
| User Speedcall - Private | The key is a Speed Call key programmed by the user. The user has designated the number as private, so the Line Type field displays "User Speedcall-Private". |

Key layout templates define the rules that software can use to map the uniquely defined keys and buttons to a specific function or value. The general framework rules include defining the order and direction in which key groupings are laid out. Sub-rules can be used to define the layout within the key grouping itself. The directionality in which key groupings are laid out may be in the form of left to right, right to left, top to bottom, bottom to top, and so forth.

A key layout template may be used for users with different roles. For example, a key layout template may be created to map all key services and features available for a specific type or model of telephone. One example illustration of a key layout template is provided in Table 4. The example is provided for a user having an employee role of sales person at a fictional company. The user can be assigned a digital telephony device having a two column button layout. Other persons having a role as sales person in the business can be assigned to a key squaring group. The key squaring group can each have a key line appearance of all of the sales people in his or her group.

In this example, the user may be assigned a digital telephony device with 48 keys arranged in two columns. As previously discussed, the odd numbered keys are located in the right column and the even numbered keys are located on the left column, with the numbering starting from the bottom.

Example rules for creating the key layout template for the user are provided below. The rules are not intended to be limiting. Rather, they are specific examples of rules used to create a key layout template using key groupings that can be compiled from information extracted from server systems and computers in communication with a digital telephony device, as previously discussed.

In this example, key squaring groups are created with a rule that the key squaring groups are assigned to keys starting from the top down. All other types of groups are assigned starting from the bottom, up. Sub-rules can then be created for each of these rules. Table 2 shows example sub-rules created for top down key groupings.

TABLE 2

Top Down Key Groupings

| Order | Feature | Sub-Rule |
|---|---|---|
| 1 | Key Squaring Group | Place in ascending order by first name. On delete set un-assigned. Pad to complete row. Exclude the current user's prime number from the group |

The "On delete set un-assigned" sub-rule can be used when a person is removed from the key squaring group. This allows the key placement for the user to be consistent once provisioned. The un-assigned key will be used again when a new member is added to the sales team. In another embodiment, this rule may not be used. In this case, it will allow the keys to shift when members are added or removed from the group. The "pad to complete row" sub-rule can be used to leave an unassigned key to ensure the last row of keys of the key squaring group will be completely used by the group. The exclude the current user's prime number rule saves an extra key from being used in the key squaring group since the current user's prime number is traditionally defaulted to a key, such as key 1 on the users set. The "exclude current user's prime number" rule is not a hard rule and some people may prefer a consistent key squaring layout instead of saving a key.

Table 3 shows example sub-rules created for bottom up key groupings.

TABLE 3

Bottom Up Key Groupings

| Order | Feature | Sub-Rule |
|---|---|---|
| 1 | Private User Speed Dial | Place in ascending order by first name. Program odd keys only Start with family members, then the rest. |
| 2 | Public User Speed Dial (Internal) | Place in ascending order by first name, Program even keys only. Populate with only the internal corporate contact list Corporate contact list is ordered by a speed call for their manager, and then their peers and then other contacts. |
| 2 | Public User Speed Dial (External) | Place in ascending order by first name starting from key 17 to 31 using odd numbers. Then place in descending order by first name starting from key 32 to 18 using even numbers. Populate with only the external corporate contact list. |
| 4 | Headset | N/A |
| 5 | Paging | N/A |
| 6 | Group Park | Place in ascending order based on the park destination directory number |
| 7 | Music | N/A |

Programming the private user speed dial with "odd keys only" enables the keys on the top right column of the phone to be programmed. Next, the internal public user speed dial keys are added to the right column of the phone. In one embodiment, the specific keys that are to be used can be designated in the key layout template. For instance, in the external public user speed dial, the designated keys are from 17 to 31 using odd numbers and from 32 to 18 using even numbers. In this example the contacts are placed across from each other on a phone with two columns of buttons.

It should be noted that the corporate contact list is specifically ordered. In another embodiment, the corporate contact list may be used in conjunction with the organizational chart to determine the proper order to list persons. The headset, paging, and music buttons do not require any sub-rules since they are a single key and, therefore, are a grouping of one.

Key Layout Template Example

To illustrate the key layout template, an example is provided in which the phone key programming for a user, referred to as John Smith, is accomplished automatically using existing information available on one or more servers and/or computers in communication with John's digital telephony device. The information extracted from the server(s) and computer(s) is referred to as user context information.

A fictional company, Ajax Widget Corporation, has a single sales group within the corporation. The sales group is comprised of John Smith, Jane Smith, Betty Jones, Buck Johnson, Terry Bob, and Ralph Carlson. The manager of the sales group is Big Cheese.

Each person in the Ajax Widget Corporation with an employee role of sales person will have many similarities that can be used to create a key layout template. For instance, each sales person's phone will include a key system appearance of everyone within the sales group. The key system appearance will comprise a key squaring group. Each sales person's phone will have a headset attached and will have access to the paging feature. The sales persons' will belong to five group park groups that are reserved for the sales force that can be numbered 5000, 5001, 5002, 5003 and 5004. Each sales person will have a public user speed call group that includes their manager. They will have a public user speed call group that contains the list of all the top buyers for Ajax Widget's products.

The corporate contact list includes a number of critical buyers consisting of Company A to Company J in this example. Each person has a digital telephone having 48 keys with two rows of 24, as used in previous examples.

The user John Smith has a personal contact list that includes his home telephone number, his wife's work number, his wife's cell number, and the telephone number for Joe's Pizza. John's personal contact list on his computer has been setup to identify these numbers to be included on his speed dial. John has also provided additional attributes in his contact list that indicate the order of importance for these contacts is: (1) his home number; (2) his wife's work number; (3) his wife's cell number; and (4) phone numbers related to restaurants. John Smith does not have any private user speed dials.

John's computer is connected with the company network. The company network is in communication with the telephony server that is connected to each employee's business phone. An automatic key layout template can be created for John's phone by extracting the user context information from the server. The top down key groupings for a key squaring group may be the same as was previously discussed. The bottom up key groupings for the sales team are described in Table 4.

TABLE 4

Sales Team Bottom Up Key Groupings

| Order | Feature | Sub-Rule |
|---|---|---|
| 1 | Prime Line | Reserve first key for Prime Line |
| 2 | Private User Speed Dial | Place in ascending order by first name. Program odd keys only |

TABLE 4-continued

Sales Team Bottom Up Key Groupings

| Order | Feature | Sub-Rule |
|---|---|---|
| 3 | Public User Speed Dial | Place in ascending order by first name, Program odd keys only. Start with personal contact list and then the corporate contact list. The corporate contact list is ordered by a speed call for their manager, then their peers, and then other corporate contacts |
| 4 | Headset | Program Even Number |
| 5 | Paging | Program Even Number |
| 6 | Group Park | Place in ascending order based on the park destination directory number. Program Even Number |
| 7 | Music | Program Even Number |

The automatic key layout for John Smith's phone is based on the rules described above for the sales team is shown in Table 5.

TABLE 5

Key Layout Template for John Smith

| Key | Feature | Key | Feature |
|---|---|---|---|
| 48 | Key appearance of Betty | 47 | Key appearance of Buck |
| 46 | Key appearance of Jane | 45 | Key appearance of Ralph |
| 44 | Key appearance of Terry | 43 | Reserved for Key appearance |
| 42 | | 41 | |
| 40 | | 39 | |
| 38 | | 37 | |
| 36 | | 35 | |
| 34 | | 33 | |
| 32 | Speed Call to Company I | 31 | Speed Call to Company H |
| 30 | Speed Call to Company J | 29 | Speed Call to Company G |
| 28 | | 27 | Speed Call to Company F |
| 26 | | 25 | Speed Call to Company E |
| 24 | | 23 | Speed Call to Company D |
| 22 | | 21 | Speed Call to Company C |
| 20 | | 19 | Speed Call to Company B |
| 18 | | 17 | Speed Call to Company A |
| 16 | Music | 15 | |
| 14 | Group Park 5004 | 13 | |
| 12 | Group Park 5003 | 11 | Speed Call to (Manager) |
| 10 | Group Park 5002 | 9 | Speed Call to Joe's Pizza |
| 8 | Group Park 5001 | 7 | Speed Call to Wife's work number |
| 6 | Group Park 5000 | 5 | Speed Call to Wife's cell number |
| 4 | Paging | 3 | Speed Call to Home Number |
| 2 | Headset | 1 | Prime Line (System Reserved) |

As shown by the example, the automatic key programming process can be used to automatically generate a well uniformed and efficient key matrix on a per user basis. The key groups are dynamically created for a user. A key layout template is then applied to the key groups to create a key mapping layout. The keys of each user's phone are programmed based on the key assignments in the key mapping layout. The key mapping layout may be created on the fly, enabling the keys to be programmed before each key has been assigned by applying the rules in the key template to the key groups. This can save significant time and effort that is traditionally used for manual key programming by an administrator or by an end user.

Another powerful feature of automatic key programming is the ability to update multiple digital telephony devices when one or more person's roles change within a business. For instance, the Ajax Widget Corporation may expand to include a two tier sales team. John Smith may move to the big leagues and be placed in the top tier sales team. The company policy can be set so that the same key layout template for both the first and second tier sales teams is used. With John Smith simply moving to another department in the corporate database, John Smith's respective key programming for his phone can be automatically updated. The phone will get a new key squaring matrix for the new sales team, a new set of speed dials to a tier two set of buyers, a new speed dial to his new manager, and a new set of group park groups. He will retain the programming of his customer user services and personal speed calls. This information may be updated automatically and a new key mapping layout generated using the key layout template when the available corporate and personal data information is changed on one or more servers. For instance, a change in a category such as a change in the organizational chart, a change in the corporate directory, a change in the user's directory, and so forth can result in the key mapping layout being automatically updated by applying the same template to the updated key grouping information that is obtained from the data on the server(s).

The traditional cloning method cannot achieve this level of simplicity since the cloning method will not be able to retain the user's personal key preferences since the keys are unique for every person. Cloning the full set of 48 keys will eliminate any custom preferences. Cloning a partial set of keys can be open to key programming artifacts. For example, if only the group park group keys are cloned, and John Smith's new group only has three group park groups, 5100, 5101, and 5102, then group park keys 5003 and 5004 will be left on his phone where he will have to manually remove the keys.

Once the key layout template has been created, the user's digital telephony device can be programmed by automatically programming each key based on the key mapping layout. The actual process of programming the keys on a digital telephony device is well understood. For instance, an application programming interface (API) can be used to program the digital telephony.

Figure 2:
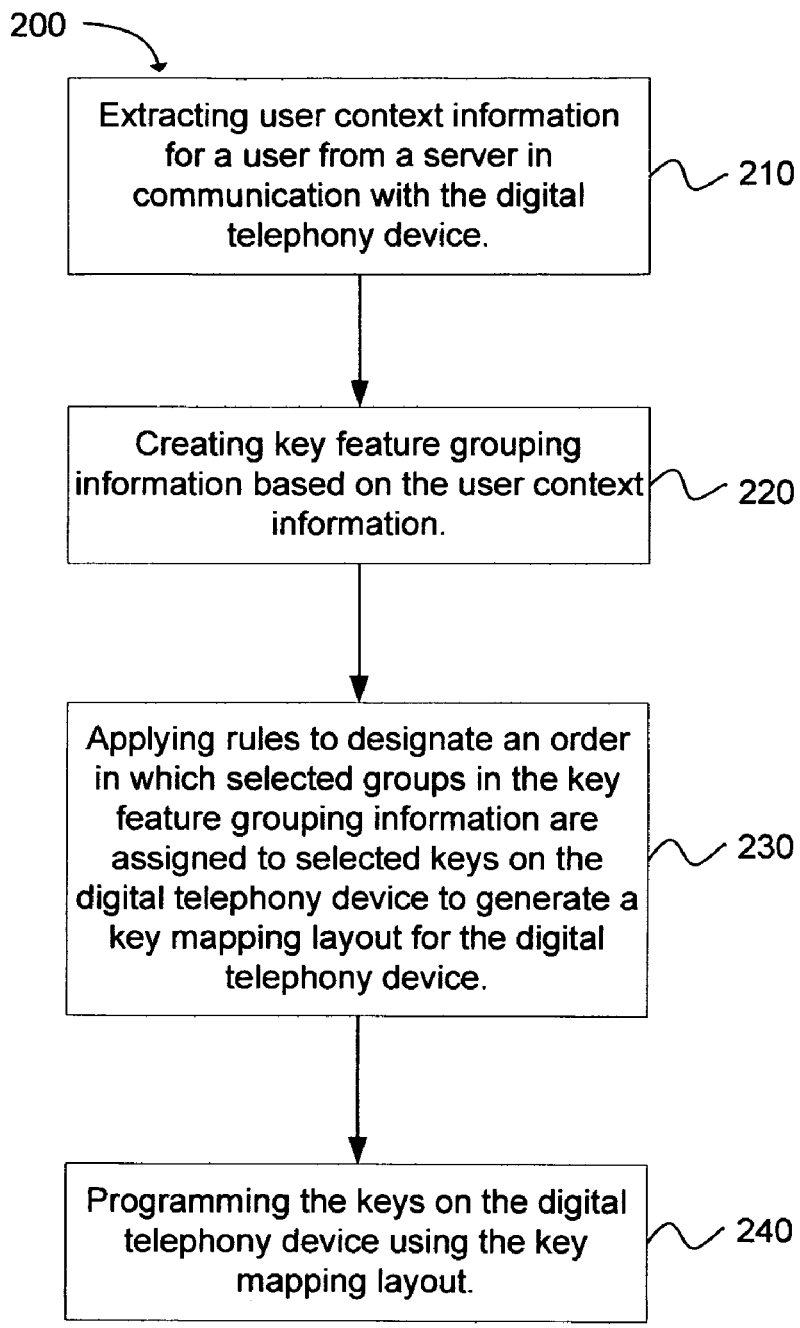
FIG. 2 depicts a flow chart of a method for programming keys on a digital telephony device in accordance with an embodiment of the present invention.

In accordance with one embodiment of the present invention, a method of programming keys on a digital telephony device is disclosed, as depicted in the flowchart of FIG. 2. The method comprises the operation of extracting 210 user context information for a user from a server in communication with the digital telephony device. As previously discussed, the user context information can be extracted from sources such as a corporate directory, an organizational chart, an employee role definition for the user, a group profile of a group to which the user has been assigned, a profile of the user, user services, and so forth. The user context information can be extracted from a source of information that is in communication with the digital telephony device such as a server that is in communication with the digital telephony device and includes information that may be used to determine key assignments.

The method 200 further comprises creating 220 key feature grouping information based on the user context information. The user context information may be designated to groupings such as key squaring groups DSS/BLF groupings, a call pickup group, a personal speed dial group, a public speed dial group, and a personal feature group. The selected groupings may be determined based on the user's employee role, the corporate policy for the group profile, and so forth.

The method 200 further comprises applying 230 rules to designate an order in which selected groups in the key feature grouping information are assigned to selected keys on the digital telephony device to generate a key mapping layout for the digital telephony device. Once the selected contacts and resources from the user context information have been designated to the desired key feature groupings, the key mapping layout can be generated.

The key mapping layout can be created based on a set of rules for each type of group. Rules such as bottom up and top down can be designated, as previously discussed. The rules for the key mapping layout for selected groups can be ordered. Sub-rules can be applied such as placing members of a group in alphabetical order, such as ascending order by first name. In selected groups, such as key squaring groups, the group can be padded to complete a row. Other sub-rules can be to assign members of a group to odd key numbers or even key numbers to place the group on a selected side of a telephony key board. The order of groups can also be determined by features such as the corporate hierarchy of the group, or corporate policies set for programming the keys on the business phones. This information can be determined from sources such as a corporate organizational chart, or information contained in the corporate directory. These rules can be adjusted as desired and additional rules can be applied to arrive at a desired key mapping layout. Substantially any number of rules may be applied to achieve the desired key mapping layout. In addition, a custom key override can be used to program at least one selected key with a selected function and adjust the key feature grouping information in view of the at least one selected key.

The method 200 further comprises programming 240 the keys on the digital telephony device using the key mapping layout. The digital telephony device can be automatically programmed using the key mapping layout using traditional key programming processes, as can be appreciated. When one or more sources or functions that are programmed on a user's digital telephony device changes then the automatic key programming can be updated. The updates can be configured to occur automatically whenever information changes in the sources from which the user context information is extracted. Dozens or even hundreds of phones can be quickly and automatically updated without the need for significant human intervention to perform manual programming on each separate digital telephony device.

Figure 3:
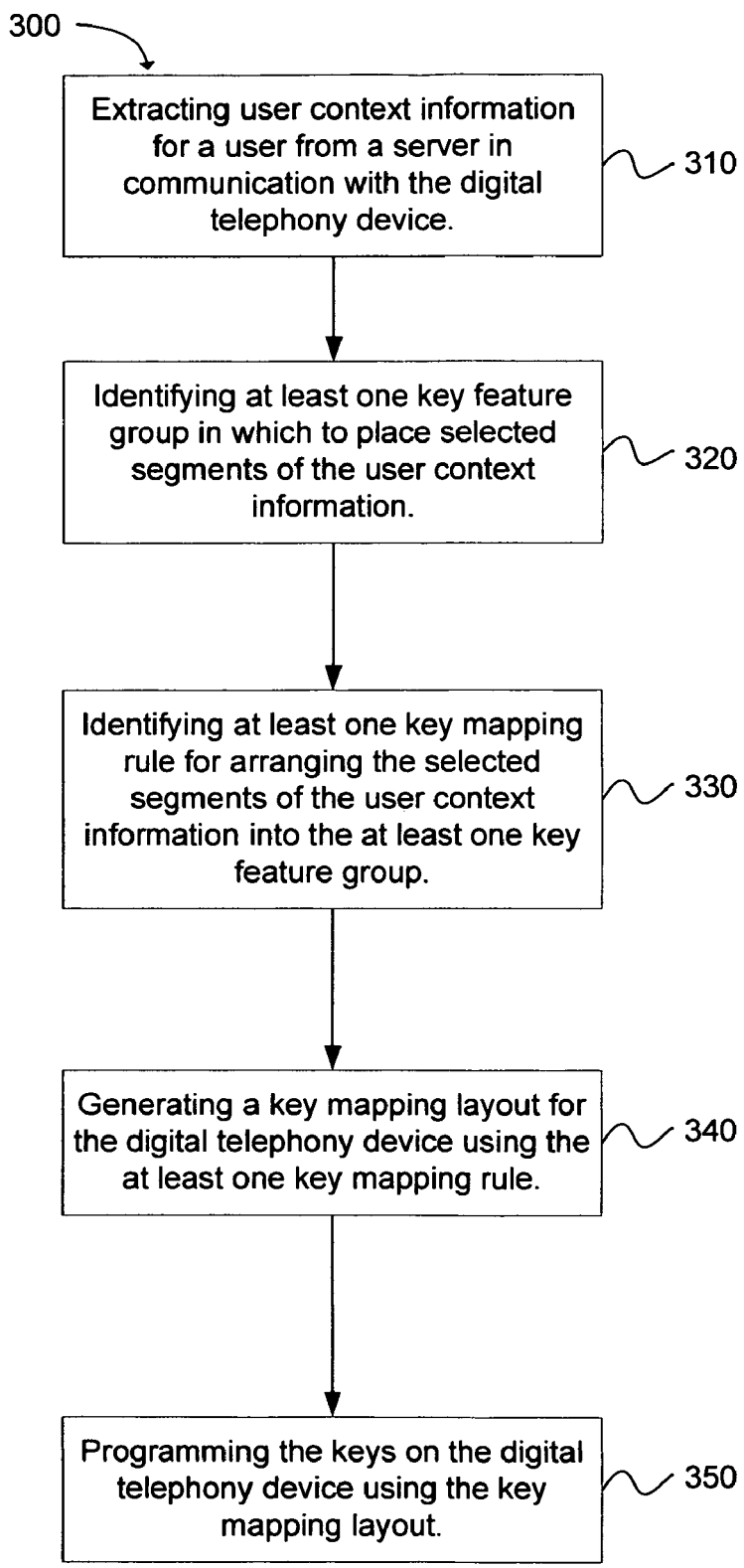
FIG. 3 depicts a flow chart for a computer program product to implement a method for programming keys on a digital telephony device in accordance with an embodiment of the present invention.

In another embodiment, a method for programming keys on a digital telephony device is disclosed that can be implemented on a computer program product. The computer program product comprises a computer usable medium having a computer readable program code embodied therein. The computer readable program code is adapted to be executed to implement the method. The method 300 is depicted in the flow chart of FIG. 3

The method 300 comprises extracting 310 user context information for a user from a server that is in communication with the digital telephony device, as previously discussed. The server may be a telephony server or another kind of server that is in communication with a telephony server.

The method 300 further comprises identifying 320 at least one key feature group in which selected segments of the user context information can be placed. The at least one key feature group can be a key squaring group, a call pickup group, a personal speed dial group, a direct station select (DSS)/busy lamp field (BLF) group, a personal feature group, and so forth. Additional types of groups may also be used, as can be appreciated. In one embodiment, no key feature groups may be identified. If this occurs then the method will not populate any keys.

The method further comprises identifying 330 at least one key mapping rule for arranging the selected segments of the user context information into the at least one key feature group. Various examples of key mapping rules have been provided and previously discussed. The key mapping rules can include rules and sub-rules. The examples provided are not intended to be limiting. The key mapping rules can include any rule that is created to arrange the groups onto the keys of the digital telephony device in a desired order. The key mapping rules can be used to generate 340 a key mapping layout for the digital telephony device. By applying the rules to the at least one feature group, the key mapping layout can be generated. Once the key mapping layout has been generated 350 then the keys on the digital telephony device can be programmed based on the key mapping layout.

The examples that have been discussed show cases in which the key layout does not conflict. However, conflicts in key layout may easily occur, wherein multiple keys are assigned to the same slots that are already occupied by existing key programming.

One process that can be used to overcome key conflicts is to bound the layout of key groupings using sub-rules. For example, there may be two key groupings, a key squaring group and a speed dial group. The key squaring group may be bound from key 48 to key 17. The speed dial group may be bound from key 16 to 2. When the key allocation exceeds the maximum allotted slots then an error may be sent to an administrator or user to signify that the maximum slots have been allotted. The user can take an appropriate action. For instance, the user may remove speed dials that really are not needed.

In another embodiment, when a key conflict occurs an error message may be sent to the administrator and the key layout programming can be halted with the keys partially programmed on the device. Alternatively, a sub-rule may indicate to overwrite any keys that may already exist in a slot and a warning can be sent to the administrator. In another embodiment, the sub-rule may indicate ato skip to the next key layout template rule on conflict and warm the administrator that something bad has occurred. Additional sub-rules may be created to deal with key conflicts as they occur, as can be appreciated.

Other Applications

The process of automatic key programming is not limited to use on digital telephony devices. The automatic key programming process can be applied to any device or application with key or button programming. For instance, a personal computer (PC) keyboard typically includes twelve programmable function keys labeled F1 to F12. These keys are typically programmed to provide desired shortcut keys for different software applications operating on the PC. In one example embodiment, a key layout template rule can be applied that defines that system administrator defined launch keys can be assigned from left to right (from F1 moving up to F12) and user defined application launch keys can be assigned from right to left (F12 to F1). An example of key grouping layout rules is provided in Table 6.

TABLE 6

Key Layout Template for Key Groupings for a PC Keyboard

| Order | Feature | Sub-Rule |
|---|---|---|
| 1 | System Defined Application Launch Keys | Applications are laid out in the following order: System Administration Tool, E-mail, Text Console, FTP application, Telnet Application |
| 2 | User Defined Application Launch Keys | First come first served |

In one example, Julie Atom is a new System Administrator for Company X. Julie has two custom applications associated with her user profile. The applications are a music player and a Twitter® application. She has marked these applications to be assigned to hotkeys for launching the applications. Company X only requires hot keys for a System Administrator Tool and a file transfer protocol (FTP) application for the system administrator. The resultant function key layout template is shown in Table 7.

TABLE 7

PC Keyboard Layout

| Key | Feature |
| --- | --- |
| F1 | Launch System Administrator Tool |
| F2 | Launch FTP Application |
| F3 | |
| F4 | |
| F5 | |
| F6 | |
| F7 | |
| F8 | |
| F9 | |
| F10 | |
| F11 | Launch Music Player |
| F12 | Launch Twitter ® |

By using the rule system, with administrator defined launch keys assigned from left to right (from F1 moving up to F12) and user defined application launch keys assigned from right to left (F12 to F1), it minimizes the chances that the system administrator or user will attempt to use the same function keys. If the same key is requested by two parties, then an additional rule can be created. For instance, the next key assigned may be assigned to the first (or last) function key plus another concurrent key, such as Shift+Function, Ctrl+Function, Alt+Function, and so forth.

Application Layout for a Tablet PC

In another embodiment, the automatic key programming process can be used to provide a desired layout of application icons on a graphical computing device such as an IPOD® Touch, or a tablet PC, such as an IPAD®, a tablet using the Android® operating system, or another type of Tablet PC. The graphical computing devices typically have launch icons that are placed on a desktop of the tablet to allow the user to access various applications. The automatic key programming (AKP) process can be used to layout the launch icons on a graphical computing device such as a tablet PC.

In one exemplary illustration, Company Z is a power generation company that has technicians monitoring the generator rooms. The technicians may be required to be present in front of the generators to perform their diagnostics with the aid of an IPAD tablet computing device. The IPAD is configured to be shareable between various employees with different roles within the company. A user can login to the IPAD device for it to automatically configure the icons based on the users profile and policy.

In this example, there are three key groupings. The diagnostic applications group is a group that includes two applications. A first application is used to monitor generator performance (GenDiag), and another application to set the generator output (GenSet). A communication applications group is a group containing an email application, such as Microsoft Outlook®, and a soft phone application, such as MitelSIP (session initiation protocol). Finally, an emergency applications group includes a single emergency location panic button application.

The key layout template rules in this example can include the following rules. The icons can be arranged from the top left down to the bottom right side of the Tablet screen. Each row is populated left to right. Icons are populated by name in ascending order. Rows are padded to allow the group to own the final row for the group. An additional rule can require that the emergency application icon is always applied first, followed by icons in the communication applications group, and then icons in the diagnostic applications group.

John Doe is a new employee in Company Z and has a role as generator inspector. Each generator inspector is required to run diagnostics on the generators three times per shift. John Doe retrieves the IPAD located at the work station near the generator and can log in. The IPAD tablet has a 4×8 icon display, allowing 32 icons to be displayed in 4 columns and 8 rows. A sync application can operate to ensure that the applications listed in the key groupings described above are installed on the IPAD when John Doe logs in. Uisng the key layout template based on John Doe's role, the icon mapping occurs for the IPAD desktop as shown in Table 8.

TABLE 8

IPAD Icon Layout

| Slot | App | Slot | App | Slot | App | Slot | App |
| --- | --- | --- | --- | --- | --- | --- | --- |
| 1 | Panic Button | 2 | | 3 | | 4 | |
| 5 | Mitel SIP Phone | 6 | Outlook | 7 | | 8 | |
| 9 | Gen Diag | 10 | Gen Set | 11 | | 12 | |
| 13 | | 14 | | 15 | | 16 | |
| 17 | | 18 | | 19 | | 20 | |
| 21 | | 22 | | 23 | | 24 | |
| 25 | | 26 | | 27 | | 28 | |
| 29 | | 30 | | 31 | | 32 | |

Figure 4:
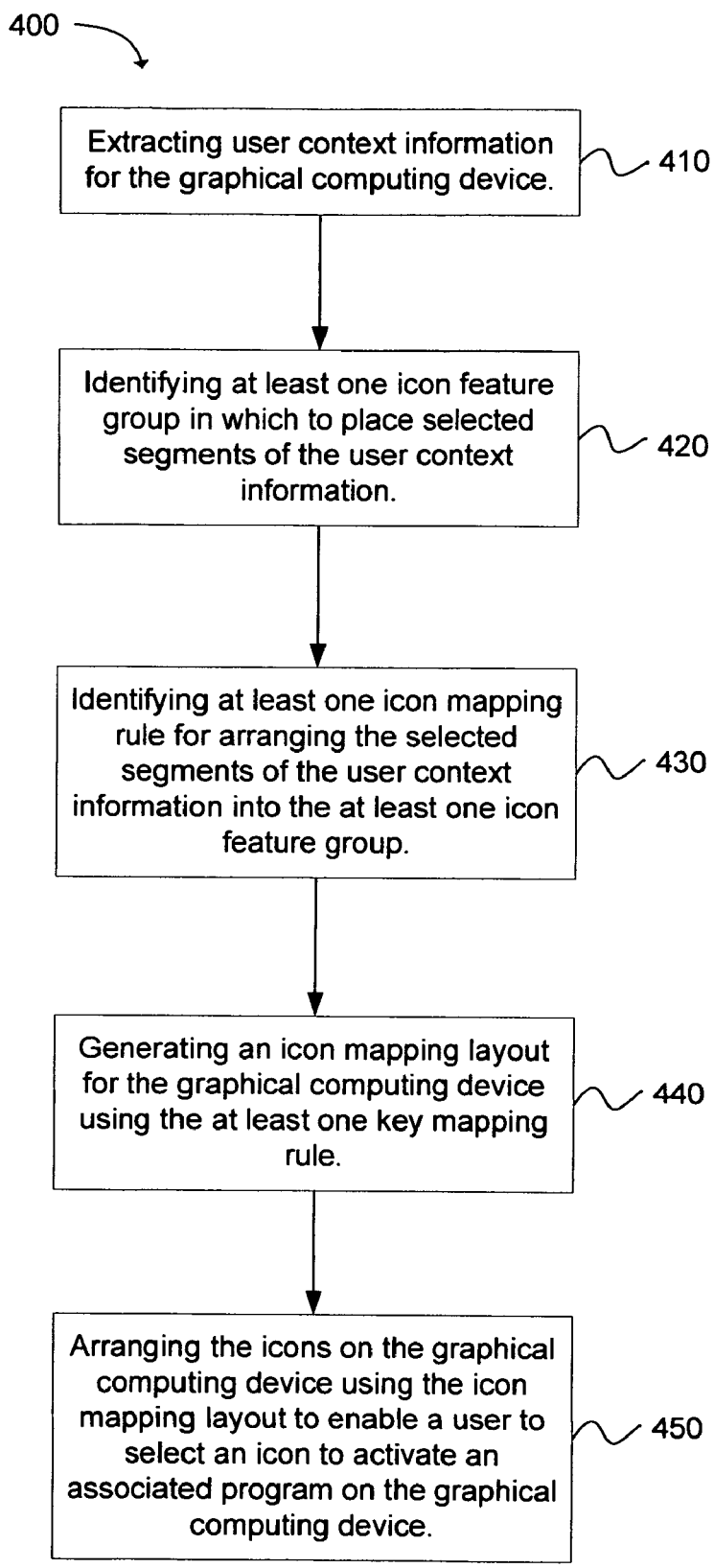
FIG. 4 depicts a flow chart of a method for distributing icons on a graphical computing device in accordance with an embodiment of the present invention.

In accordance with an embodiment of the present invention, a method 400 of distributing icons on a graphical computing device is disclosed, as depicted in the flow chart of FIG. 4. The icons can be used as shortcuts to applications that a user, such as an employee, will operate on his or her computing device. The method includes the operation of extracting 410 user context information for the graphical computing device. As previously discussed, the user context information can be extracted from sources such as a corporate directory (i.e. phone book), an organizational chart, an employee role definition for the user, a group profile of a group to which the user has been assigned, a profile of the user, and user services. By understanding the employee's role and group profile, the applications that an employee may use can be determined.

The method 400 further includes the operation of identifying 420 at least one icon feature group in which to place selected segments of the user context information. Icon feature groups can be selected based on the employee's role, group profile, and other information, to determine which groups the applications (i.e. programs) associated with the icons will be organized into. Icon feature groups can include groups such as a communications program group, an office program group, a niche group, an emergency response program group, and a personal program group. Icons can be placed in the group with which the icon's application is most closely associated. In one embodiment, each application that will operate on the computing device can be assigned to a selected group.

The method 400 additionally includes identifying 430 at least one icon mapping rule for arranging the selected segments of the user context information into the at least one icon feature group. The mapping rules can be selected to provide a desired layout, to increase the employee's efficiency, and based on the employee's needs. For instance, in the example above, the emergency response icon associated with an emergency response program is always positioned in the upper left corner. By making sure that this icon is always located in this position, it can significantly enhance an employee's ability to quickly activate the program when needed.

The at least one key mapping rule can be used to generate 440 an icon mapping layout for the graphical computing device. Once the icon mapping layout has been generated, a program can be used to arrange 450 the icons on the graphical computing device using the icon mapping layout. A user can then select an icon to activate an associated program on the graphical computing device. In one embodiment, the icons can be arranged based on the icon mapping layout at startup, or login by a selected user. This enables multiple users to be able to use the same graphical computing device that displays selected icons in a desired arrangement for each separate user.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of programming keys on a digital telephony device, comprising:
    extracting user context information for a user from a server in communication with the digital telephony device;
    creating key feature grouping information based on the user context information;
    applying rules to designate an order in which selected groups in the key feature grouping information are assigned to selected keys on the digital telephony device to generate a key mapping layout for the digital telephony device; and
    programming the keys on the digital telephony device using the key mapping layout.

2. The method of claim 1, further comprising extracting the user context information from a corporate directory, an organizational chart, an employee role definition for the user, a group profile of a group to which the user has been assigned, a profile of the user, and user services.

3. The method of claim 1, further comprising selecting direct station select (DSS)/busy lamp field (BLF) groupings from the user context information.

4. The method of claim 1, further comprising creating the key feature grouping information for at least one group selected from the groups consisting of a key squaring group, a call pickup group, a personal speed dial group, and a personal feature group.

5. The method of claim 1, further comprising inserting a custom key override to enable the user to program at least one selected key with a selected function and adjusting the key feature grouping information in view of the at least one selected key.

6. The method of claim 1, further comprising applying the rules based on a key layout on a selected mode of the digital telephony device.

7. The method of claim 1, further comprising sending a warning to an administrator when a selected key is assigned more than once.

8. The method of claim 1, further comprising sending a warning to an administrator when key allocation exceeds a maximum number of allotted slots.

9. A computer program product, comprising a computer usable medium having a non-transitory computer readable program code embodied therein, said computer readable program code adapted to be executed to implement a method for programming keys on a digital telephony device comprising:

extracting user context information for a user from a server in communication with the digital telephony device;

identifying at least one key feature group in which to place selected segments of the user context information;

identifying at least one key mapping rule for arranging the selected segments of the user context information into the at least one key feature group;

generating a key mapping layout for the digital telephony device using the at least one key mapping rule; and programming the keys on the digital telephony device using the key mapping layout.

10. The method of claim 9, further comprising extracting the user context information from a corporate directory, an organizational chart, an employee role definition for the user, a group profile of a group to which the user has been assigned, a profile of the user, and user services.

11. The method of claim 9, further comprising selecting direct station select (DSS)/busy lamp field (BLF) groupings from the user context information.

12. The method of claim 9, further comprising inserting a custom key override to enable the user to program at least one selected key with a selected function and adjusting the key feature grouping information in view of the at least one selected key.

13. The method of claim 9, wherein generating the key mapping layout for the digital telephony device further comprises generating the key mapping layout by applying the key mapping rules to designate an order in which the key feature groups are assigned to selected keys on the digital telephony device.

14. The method of claim 9, further comprising identifying the at least one key feature group from the groups consisting of a key squaring group, a call pickup group, a personal speed dial group, a direct station select (DSS)/busy lamp field (BLF) group, and a personal feature group.

15. A method of distributing icons on a graphical computing device, comprising:

extracting user context information for the graphical computing device;

identifying at least one icon feature group in which to place selected segments of the user context information;

identifying at least one icon mapping rule for arranging the selected segments of the user context information into the at least one icon feature group;

generating an icon mapping layout for the graphical computing device using the at least one icon mapping rule; and arranging the icons on the graphical computing device using the icon mapping layout to enable a user to select an icon to activate an associated program on the graphical computing device.

16. The method of claim 15, further comprising extracting the user context information from a corporate directory, an organizational chart, an employee role definition for the user, a group profile of a group to which the user has been assigned, a profile of the user, and user services.

17. The method of claim 15, further comprising identifying at least one icon feature group selected from the icon feature groups selected from the group consisting of a communications program group, an office program group, a niche group, an emergency response program group, and a personal program group.

18. The method of claim 15, further comprising arranging the icons for the user when the user logs in to the graphical computing device.

19. The method of claim 15, further comprising inserting a custom icon override to enable the user to insert at least one icon at a selected location and adjusting the icon feature group information in view of the at least one inserted icon.

20. The method of claim 15, wherein generating the icon mapping layout for the graphical computing device further comprises generating the icon mapping layout by applying the at least one icon mapping rule to designate an order in which the at least one icon feature group is assigned to selected icons on the graphical computing device.

* * * * *